Patented May 16, 1933

1,909,183

UNITED STATES PATENT OFFICE

JAMES W. LAWRIE, OF SHOREWOOD, WISCONSIN, ASSIGNOR TO E. I. DU PONT DE NEMOURS & COMPANY, OF WILMINGTON, DELAWARE, A CORPORATION OF DELAWARE

ACETIC ACID MANUFACTURE FROM GLYCEROL FERMENTATION RESIDUES

No Drawing. Application filed May 14, 1930. Serial No. 452,526.

This invention relates to a process of producing acetic acid. More particularly the present invention relates to the production of acetic acid from waste residues from the recovery of glycerol resulting from fermentation processes.

There are many known methods of recovering useful products from spent alcoholic fermentation slop. For example, acetic, succinic, glutaric and lactic acids, as well as glycerol, produced in the process of fermentation, betain and potassium salts, are some of the various materials that attempts have heretofore been made to recover. Few of the methods proposed for recovering these materials, however, have been of practical commercial value, because the cost of evaporating, treating, etc., is usually higher than the value of the products produced, unless such methods are compulsory to offset the cost of disposal of the fermentation slops where disposal must be in some way other than by running the slops into the sewer or the like with the accompanying disadvantages of causing stream pollution or otherwise creating an unsanitary condition.

In the molasses usually used as the raw material in these fermentation processes, there is present a large portion of non-sugar organic material. An average blackstrap molasses will show, for example, approximately the following composition:

| | Percent |
|---|---|
| Sugars (Fehling's method) | 48 –52 |
| Salts { Soluble | 3.6– 4.8 |
| Salts { Insoluble | 2.4– 3.2 |
| Water | 18 –20 |
| Organic non-sugars | 23 –25 |

The foregoing is merely a typical example and the proportions will vary depending on the source and character of the raw material.

By the term "spent fermentation residue", as used herein, I mean to include the unfermented organic matter, the salts present in the raw material, those added in the process of manufacture, such as sodium carbonate, or produced initially in the fermentation, such as sodium acetate, and also dead yeast and bacteria cells, all being present, though already in part decomposed by heat, in the residue from which the glycerol has been removed by spray distillation or otherwise.

I have found that by calcining this spent fermentation residue under proper control of temperature and time conditions, some of the non-sugar organic matter present is converted into acetic acid, which may be recovered together with any acetic acid present before the calcination. The acetic acid thus produced reacts with the alkaline salts present to yield acetates. The temperature and length of time of calcination are very important both from the standpoint of yield and ease of recovery of the by-products. For example, if the dry residue is calcined at too low a temperature, even for a long period, the acetic acid yields are low and the resulting solutions are highly colored, which results in a greater problem in the recovery of the valuable products. On the other hand, if the temperatures are too high, even if for comparatively short periods, the acetates formed are further broken down and there will be little, if any, increase and probably a decrease in the amount of acetic acid recoverable, over that recoverable without calcination.

I have also found that the addition of alkaline materials to the fermentation residue, in addition to that which may be already present, and calcination of the dry mixture with proper control of temperature and time conditions will result in an increased conversion of the organic matter present to acetic acid and acetates. For this purpose, any of the common alkaline materials such as the oxides, hydroxides, carbonates and bicarbonates of the alkalies and alkaline earths may be used. Yields vary as different amounts and kinds of alkaline materials are used. In general, however, I prefer to use either ground limestone or hydrated lime, because of their cheapness.

By way of description of the process, the following is given, but it will be understood that other embodiments exist and may be practiced without departure from the spirit of the invention.

The dilute slop produced by the distillation of the alcohol from an alkaline fermentation is evaporated by any well known means, such as multiple effect evaporation, to a viscous syrup. From this syrup, the glycerol may then be recovered by any known distillation method. The residue from the glycerol recovery apparatus may then be mixed or not with dry alkaline material, and is then calcined at a temperature of from 300 to 400° C. for a period of approximately five to sixty minutes. Preferably I use a temperature of 350° C. for a period of fifteen minutes. The period of calcination and the temperature used are partially dependent on the amount and kind of alkaline material employed in order to get the optimum results.

The spray distillation residue as usually produced is, while hot, a dark colored viscous, practically water-free mass, having the structure of a coarse foam, and in this condition it may be mixed directly with the alkaline material; upon cooling, however, it first becomes a brittle solid, and then rapidly takes up moisture from the air becoming pasty, when it is difficult to work. It is therefore advantageous to get the alkaline material mixed with the residue as soon as possible after the discharge of the latter from the glycerol recovery apparatus.

During the calcination, chemical reactions take place with the organic constituents resulting in the formation of acetate. The resulting calcined residue comprises the salts present in the raw material, acetates, alkalies, and some carbon or organic matter which is practically insoluble in water. When the residue from a properly controlled calcining operation is added to water, the soluble matter dissolves, and may be separated from the insoluble matter by filtration or other well known means, giving a solution of a light straw color. The soluble material may also be separated by lixiviation. From this solution the acetates and valuable potassium and other salts can be recovered by any of the well known processes.

The solution of acetates, soluble salts, etc., may be acidified and the acetic acid recovered by the Suida or Brewster processes, or any other process suitable for this purpose, and the soluble salts further recovered by evaporation of the solution and crystallization, or the acetic acid may be converted to esters such as ethyl, propyl, or butyl acetates, etc., by the addition of the corresponding alcohols, acidification and appropriate subsequent treatments, such as distillation, etc., and the spent solution of acid and salts can be treated further for the recovery of valuable salts.

In this manner, with the addition of approximately three parts by weight of lime to one part by weight of the dry residue, yields of acetic acid of over 30% of the weight of dry residue from the spent slop may be produced. This is equivalent to approximately .75 to 1.2 pounds of 100% acetic acid per gallon of raw material (molasses) used in the original fermentation. These, as will be understood, are average yields and are illustrative only. Even greater yields may be obtained under carefully controlled conditions.

While this invention is concerned principally with the production of acetic acid, there may be also small quantities of other fatty acids produced, such as formic, propionic, etc.

My process may be carried out under high pressure, under atmospheric pressure, or under reduced pressure, although I preferably use atmospheric pressure. The process may, with advantage, be carried out in the presence of inert gas or gases, such, for example, as carbon dioxide, nitrogen, flue gases, etc.

I have also found that when my process is carried out in the presence of certain metals and metallic compounds, that the acetic acid is decomposed and the final yield greatly reduced. I have found that among the substances active as decomposing catalysts in this connection, are ferrous compounds and metallic iron. For this reason I propose to conduct the process of the present invention in a system having any metal that comes in contact with the reacting products of non-ferrous composition. On the other hand, copper has been found to be relatively inactive as a decomposition catalyst of acetic acid or acetates under these conditions; as an example, by the use of copper for this purpose, I have found that the total yield of acetic acid may be increased by 100% or more of its original value, while with the use of iron a loss in yield of as much as 25% of the original value may result.

As an example, 1,000 grams of fresh residue from a spray tower in which fermentation glycerol is being recovered, is intimately mixed with 3,000 grams of powdered limestone, and the mixture is then place in a copper vessel arranged so that the air present may be displaced by carbon dioxide, and heated to 350° C. for fifteen minutes. The calcined mass is then allowed to cool in the presence of the carbon dioxide gas. The cooled calcined material is then removed, ground to a fine powder, and mixed with 500 grams of alcohol, and sufficient sulfuric acid cautiously added to give a slight excess of the acid. The mixture is then heated with reflux condensation on a steam bath for about one hour, after which the volatile products are distilled off; these consist of about 290 grams of ethyl acetate, traces of other ethyl esters, and the excess of unconsumed alcohol, with some water. Alternatively, the calcined mass may be ground, leached, and the resulting solution of acetates and other salts worked up by known methods for the recovery of the acetic acid; any valuable salts recoverable by crystallization, or other processes may in this case be removed prior to the recovery of the acetic acid, these modifications resulting in greater return, and greater economy in the sulfuric acid required to liberate the acetic acid.

As many apparently widely different embodiments of this invention may be made without departing from the spirit thereof, it is to be understood that I do not limit myself to the foregoing examples or descriptions except as indicated in the following patent claims.

I claim:

1. The process of producing acetic acid which comprises calcining at temperature of 300 to 400° C. spent fermentation residue in the presence of an alkaline compound taken from a group consisting of the oxides, hydroxides, and carbonates of the alkali and alkaline-earth metals.

2. The process of claim 1 in which the group of alkaline compounds consists of hydrated lime, soda ash, and caustic soda.

3. The process of producing acetic acid which comprises calcining spent fermentation residue for a period of from five to sixty minutes at a temperature of approximately 350° C. in the presence of calcium carbonate.

4. The process of producing acetic acid which comprises calcining spent fermentation residue for from five to sixty minutes at a temperature of approximately 300° to approximately 400° C. in the presence of an amount of calcium carbonate approximately three times by weight of the dry slop or residue.

5. The process of producing acetic acid which comprises calcining spent fermentation residue for a period of approximately fifteen minutes at a temperature of approximately 300° to approximately 400° C. in the presence of calcium carbonate.

In testimony whereof, I affix my signature.

JAMES W. LAWRIE.